3,202,678
ALKENYL SUCCINIMIDES OF TETRA-
ETHYLENE PENTAMINE
Frank A. Stuart, Orinda, Robert G. Anderson, Novato,
and Alan Y. Drummond, Richmond, Calif., assignors
to California Research Corporation, San Francisco,
Calif., a corporation of Delaware
No Drawing. Filed Aug. 24, 1959, Ser. No. 835,411
3 Claims. (Cl. 260—326.5)

This invention pertains to a new class of compounds particularly useful as lubricating oil addition agents. These new compounds are N-polyamine substituted alkenyl succinimides.

Alkenyl succinic anhydrides and numerous derivatives thereof are well known in the art. For example, alkenyl succinic anhydrides in which the alkenyl radical contains from 5 to 20 carbon atoms are taught as corrosion inhibitors in lubricating oil compositions. Also, products obtained by reacting such alkenyl succinic anhydrides with monoamines are taught as ferrous corrosion inhibitors for lubricating oil compositions.

However, the above known alkenyl succinimides are not useful as detergents in lubricating oil compositions. In contrast thereto, the polyamine alkenyl succinimides described herein are new compounds which are useful as detergents in lubricating oil compositions.

Thus, it is a primary object of this invention to present as new compounds, new alkenyl succinimides which are particularly useful as detergents in lubricating oil compositions.

In accordance with this invention, it has been discovered that N-substituted monoalkenyl succinimides derived from (II)

monoalkenyl succinic anhydrides and tetraethylene pentamine are new compounds which are effective lubricating oil additives.

The N-substituted monoalkenyl succinimides derived from tetraethylene pentamine of this invention are particularly effective as detergents in lubricating oil compositions. By the use of oil compositions containing these alkenyl succinimides, diesel and gasoline engine parts remain remarkably free of deposits and varnish even under severe operating conditions.

These new compounds, which are monoalkenyl succinimides of tetaethylene pentamine, have the formula:

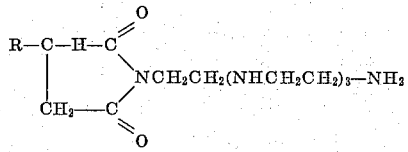

wherein R is a hydrocarbon radical having a molecular weight from about 400 to about 3000; that is, R is a hydrocarbon radical containing about 30 to about 200 carbon atoms.

These N-substituted alkenyl succinimides can be prepared by reacting maleic anhydride with an olefinic hydrocarbon, followed by reacting the resulting alkenyl succinic anhydride with tetraethylene pentamine. The "R" radical of the above formula, that is, the alkenyl radical, is derived from an olefin containing from 2 to 5 carbon atoms. Thus, the alkenyl radical is obtained by polymerizing an olefin containing from 2 to 5 carbon atoms to form a hydrocarbon having a molecular weight ranging from about 400 to about 3000. Such olefins are exemplified by ethylene, propylene, 1-butene, 2-butene, isobutene, and mixtures thereof. Since the methods of polymerizing the olefins to form polymers thereof is immaterial in the formation of the new compound described herein, any of the numerous processes available can be used therefor.

The preparation of N-substituted monoalkenyl succinimides derived from tetraethylene pentamine can be described generally by the following equations, using a polymer of isobutene as an example of the alkenyl radical.

(I)

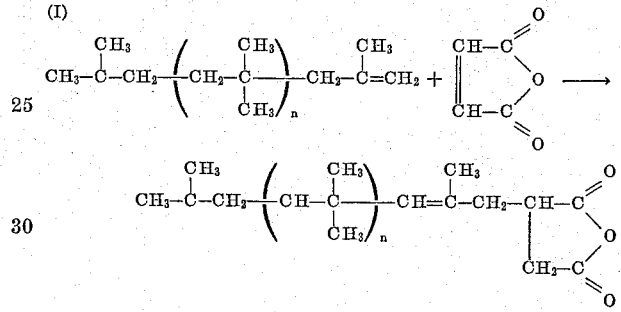

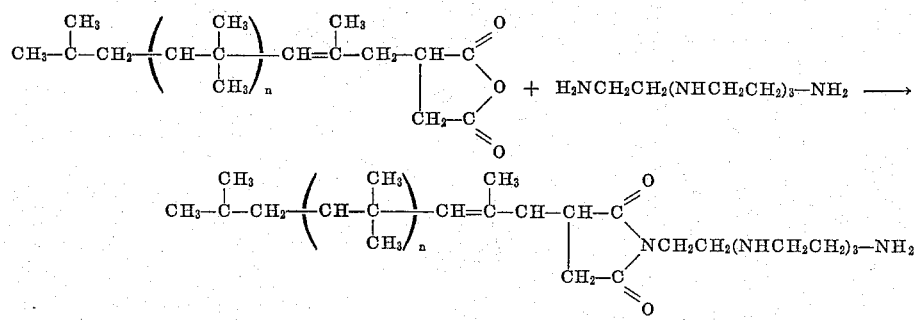

wherein $n$ has a value of about 7 to about 50

The above reaction between a polyolefin and maleic anhydride is an uncatalyzed addition reaction which should not be confused with a copolymerization reaction such as that obtained with a vinyl monomer and maleic anhydride. While the general reaction of an olefin and maleic anhydride is well known for olefins of low molecular weight (e.g., olefins of 18 carbon atoms), no previous work has been done with maleic anhydride and the high molecular weight olefins as described herein.

The reaction set forth and described hereinabove can proceed in a mol ratio of the polyolefin to the maleic anhydride of 1:1 to 1:10; preferably from 1:1 to 1:5. The reaction temperature can vary from 300° F. to 450° F. Because of the greater yield of products obtained thereby, it is preferred to use the higher temperature range (e.g., 375° F. to 450° F.).

In the second step of the reaction as exemplified by Equation II hereinabove, the yield of the imide is extremely high even though the reactants are used in equal molar ratios. This is surprising, since under the conditions of the reaction there is an excess of secondary amino groups over primary amino groups, and any reaction with the secondary amino groups would lead to amide formation; thus preventing imide formation.

The reaction described by Equation II hereinabove can be made at 220° F. to 500° F., preferably from 300° F. to 400° F. The alkenyl succinic anhydride and the tetraethylene pentamine are reacted in about equal molar quantities.

Since the reaction between the polyolefin and maleic anhydride may not go to completion, the resulting alkenyl succinic anhydride may contain some unreacted polyolefin. As it may not be desirable to separate out this unreacted polyolefin at this stage, the resulting imide formed by reaction of the alkenyl succinic anhydride and tetraethylene pentamine will contain this polyolefin as an impurity which can be a diluent in the formation of lubricating oil compositions. However, if it is so desired, this unreacted polyolefin can be removed by precipitation, for example, by acetone or methanol from a hydrocarbon solution.

The preparation of the alkenyl succinimides of tetraalkylene pentamine is illustrated in the following examples.

EXAMPLE I

*Preparation of polybutenyl succinic anhydride*

A mixture of 1000 grams (1 mol) of a polybutene having a molecular weight of about 1000 and 98 grams (1 mol) of maleic anhydride was heated at 410° F. in a nitrogen atmosphere with agitation for a period of 24 hours. The reaction mixture was cooled to 150° F., and 700 cc. of hexane added; after which the mixture was filtered under vacuum. After vacuum distillation to remove the hexane from the filtrate, the product was maintained at 350° F. at an absolute pressure of 10 mm. Hg for one hour to remove traces of maleic anhydride. The crude polybutenyl succinic anhydride thus prepared had a saponification number of 79.

EXAMPLE II

*Preparation of tetraethylenepentamine derivative of the polybutenyl succinic anhydride of Example I hereinabove*

A mixture of 84 grams (0.45 mol) of tetraethylene pentamine and 702 grams (0.45 mol) of the polybutenyl succinic anhydride of Example I hereinabove, was blended with agitation at 125° F. in a nitrogen atmosphere. The temperature was increased to 400° F. during a period of one hour, after which the absolute pressure was reduced to about 200 mm. Hg during a period of 30 minutes to facilitate the removal of water. The reaction mixture was then allowed to reach room temperature at this reduced pressure. The reaction product contained 5.1% nitrogen (theory 5.4%). Infra-red analysis showed that the reaction product was an imide containing a polybutene side chain.

The new compounds of this invention are more effective as lubricating oil additives than alkenyl succinimides having fewer nitrogen atoms in the amine portion of the molecule, and succinimides having less than about 30 carbon atoms in the alkenyl radical. The use of amylamine, for example, in place of tetraethylene pentamine of this invention results in a product which is ineffective as a detergent in lubricating oil compositions.

As lubricating oil additives, the N-substituted alkenyl succinimides derived from tretraethylene pentamine can be used in amounts of 0.1% to 80%, by weight, preferably 0.25% to 5%, by weight.

Table I hereinbelow sets forth data showing the effectiveness of the new compounds of this invention as lubricating oil additives.

The monoalkenyl succinimide used was an N-substituted alkenyl succinimide derived from tetraethylene pentamine wherein the alkenyl radical had a molecular weight of approximately 1000, which alkenyl radical was a polymer of isobutene.

The tests were made in a Caterpillar L–1 engine according to Supplement I conditions for a period of 120 hours as described in the Coordinating Research Council Handbook, January 1946.

The "PD Nos." refer to the piston discoloration rating. After the engine test, the three piston lands were examined visually. To a piston land which was completely black was assigned a PD number of 800; to one which was completely clean, a PD number of 0; to those intermediate between completely black and completely clean were assigned PD numbers intermediate in proportion to the extent and degree of darkening.

The "G.D. Nos." refer to the percentage deposits in the piston ring grooves; a 0 evaluation being a clean groove; and a number of 100 being a groove full of deposits.

The base oils were California SAE 30 base oils.

TABLE I

| Additive | A | B |
|---|---|---|
| Succinimide, wt. percent | 0.0 | 3.0 |
| Test results: | | |
| G.D. No | *39 | 4 |
| P.D. No | 800, 800, 800 | 0.0.0 |

*These test results were obtained in a Caterpillar L–1 test under the MIL-L-2104 conditions. Under the more severe supplement-1 conditions, the G.D. Nos. would be considerably higher.

It is readily seen from the data set forth hereinabove in Table I that alkenyl succinimides of tetraalkylene pentamine as described herein are effective as lubricating oil additives for the lubrication of internal combustion engines.

We claim:

1. A compound

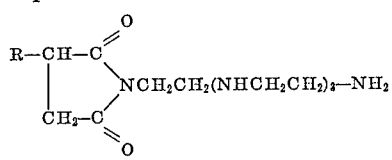

wherein R is a polyolefin radical of from 30 to 200 carbon atoms and is derived from an olefin of 2 to 5 carbon atoms.

2. A compound

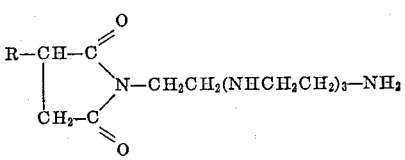

wherein $n$ has a value of about 7 to about 50.

3. A compound, monoalkenyl succinimide of tetraethylene pentamine, of the formula:

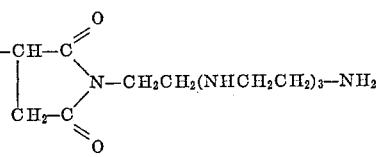

wherein R is a polyisobutene radical having a molecular weight of about 1,000.

References Cited by the Examiner

UNITED STATES PATENTS 2,638,450   5/53   White et al. _____ 260—326.5

NICHOLAS S. RIZZO, *Primary Examiner.*

IRVING MARCUS, WALTER A. MODANCE,
*Examiners.*